United States Patent
Jacobowitz et al.

(10) Patent No.: US 7,917,785 B2
(45) Date of Patent: Mar. 29, 2011

(54) METHOD OF OPTIMIZING PERFORMANCE OF MULTI-CORE CHIPS AND CORRESPONDING CIRCUIT AND COMPUTER PROGRAM PRODUCT

(75) Inventors: Lawrence Jacobowitz, Wappingers Falls, NY (US); Mark B. Ritter, Sherman, CT (US); Daniel J. Stigliani, Jr., Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 906 days.

(21) Appl. No.: 11/747,300

(22) Filed: May 11, 2007

(65) Prior Publication Data

US 2008/0282074 A1 Nov. 13, 2008

(51) Int. Cl.
- G06F 1/26 (2006.01)
- G06F 1/00 (2006.01)
- G06F 1/32 (2006.01)
- G01R 31/00 (2006.01)

(52) U.S. Cl. ............ 713/320; 713/2; 713/100; 713/321; 713/322; 713/330; 702/118

(58) Field of Classification Search ............... 713/2, 100, 713/320, 321, 322, 330; 702/118
See application file for complete search history.

(56) References Cited

U.S. PATENT DOCUMENTS

| | | | |
|---|---|---|---|
| 7,188,261 B1* | 3/2007 | Tobias et al. | 713/300 |
| 7,233,162 B2* | 6/2007 | Arabi et al. | 324/765 |
| 2002/0087896 A1* | 7/2002 | Cline et al. | 713/300 |
| 2004/0230392 A1* | 11/2004 | Weller | 702/81 |
| 2005/0049729 A1* | 3/2005 | Culbert et al. | 700/50 |
| 2006/0259800 A1* | 11/2006 | Maejima | 713/300 |
| 2006/0288241 A1 | 12/2006 | Felter et al. | |
| 2007/0079197 A1* | 4/2007 | Boerstler et al. | 714/733 |
| 2007/0226482 A1* | 9/2007 | Borkar et al. | 713/100 |
| 2008/0082285 A1* | 4/2008 | Samaan et al. | 702/118 |
| 2008/0148120 A1* | 6/2008 | Seuring | 714/742 |

OTHER PUBLICATIONS

"Method and System for Digital Frequency Clocking in Processor Cores", U.S. Appl. No. 11/734,375, filed Apr. 12, 2007.

* cited by examiner

*Primary Examiner* — Vincent T Tran
(74) *Attorney, Agent, or Firm* — Ryan, Mason & Lewis, LLP

(57) ABSTRACT

A method of optimizing performance of a multi-core chip having a plurality of cores includes the steps of determining a $V_{dd}$-frequency SCHMOO characteristic for each of the plurality of cores individually; saving data indicative of the Vdd-frequency SCHMOO characteristics for each of the plurality of cores; configuring the cores to obtain a configuration providing at least one of optimum power consumption and optimum performance, for a given workload, based on the saved data; and saving the configuration such that it may be updated and used on at least one of a periodic and a continual basis.

21 Claims, 3 Drawing Sheets

METHOD OF OPTIMIZING PERFORMANCE OF MULTI-CORE CHIPS AND CORRESPONDING CIRCUIT AND COMPUTER PROGRAM PRODUCT

FIELD OF THE INVENTION

The present invention relates to the field of electronics. In particular, it relates to the performance of multi-core chips.

BACKGROUND OF THE INVENTION

Synchronous, multi-core processor chips are showing mole regional technology variability at mole advanced technology nodes, and this variability is increasing. To deal with this, people have maintained synchronous operation by changing the system clock frequency and modifying all the local core $V_{dd}$ settings in older to arrive at a common frequency at which the multi-core chip will run. This common frequency is the lowest-common operating frequency; therefore, much of the possible system performance intrinsic in the faster cores is lost. By some estimates, the degree of the performance loss due to regional variability could be as much as would be lost by backing up the design by an entire technology generation.

It would thus be desirable to overcome the limitations in previous approaches.

SUMMARY OF THE INVENTION

Principles of the present invention provide techniques for optimizing performance of multi-core chips. In one aspect, an exemplary method (which can be computer implemented) includes the steps of: determining a $V_{dd}$-frequency SCHMOO characteristic for each of the plurality of cores individually; saving data indicative of the Vdd-frequency SCHMOO characteristics for each of the plurality of cores; configuring the cores to obtain a configuration providing at least one of optimum power consumption and optimum performance, for a given workload, based on the saved data; and saving the configuration such that it may be updated and used on at least one of a periodic and a continual basis.

In another aspect, an inventive circuit includes a plurality of cores, each of the cores having error detection circuitry and being connected to selected other ones of the cores via core-to-core interconnects; a voltage controller interface (to an on-chip or external voltage controller); a frequency control module; and a SCHMOO controller. The mentioned elements are operatively interconnected and configured to cause execution of the following steps:
  (i) resetting all error detection circuitry, setting $V_{dd}$ for each of the cores, and setting a frequency believed to be sufficiently low for all operational ones of the plurality of cores to function;
  (ii) checking for errors in individual ones of the plurality of cores after a specified time to verify that $V_{dd}$ was sufficiently high and the frequency sufficiently low for all operational ones of the plurality of cores to function;
  (iii) while holding $V_{dd}$ constant for each of the cores, incrementing frequency by a predetermined amount for each of the cores;
  (iv) waiting for stabilization;
  (v) checking for errors;
  (vi) repeating the incrementing until at least one of the cores fails and logging such failure; and
  (vii) repeating step (vi) until all of the cores have failed.

One or more embodiments of the invention or elements thereof can be implemented in the form of a computer product including a computer usable medium with computer usable program code for performing the method steps indicated. Furthermore, one or more embodiments of the invention or elements thereof can be implemented in the form of an apparatus including a memory and at least one processor that is coupled to the memory and operative to perform exemplary method steps.

These and other features, aspects, and advantages of the present invention will become apparent from the following detailed description of illustrative embodiments thereof, which is to be lead in connection with the accompanying drawings.

DETAILED DESCRIPTION OF PREFERRED EMBODIMENTS

One or more inventive embodiments can provide techniques to determine what frequency and voltage each core should be run at in order to provide the desired power and/or performance metric for the system. In one aspect, an automated $V_{dd}$/local frequency SCHMOO uses error correction coding (ECC) circuits, such as those which already exist in some processors, in order to determine the SCHMOO plot (valid operating region) for each core. As will be appreciated by the skilled artisan, a "SCHMOO" is a two-dimensional plot of the valid $V_{dd}$ and frequency operating region of a circuit, such as a processor core. Knowing the $V_{dd}$/Frequency SCHMOO for each core allows a power/performance optimization of the chip which, in one or more embodiments, could be changed in the future in real-time depending on the workload. It should be noted that while mention is made of existing ECC circuits, it is only these circuits per se that are known; the present specification sets forth inventive techniques for employing such existing ECC circuits to develop SCHMOO data for optimization.

In one embodiment, there are three steps in power/performance optimization, namely: (i) determine the Vdd/Frequency SCHMOO for each core on a chip individually; (ii) save this data for each core, for example, in an E-fuse array on chip, or in a serial EEPROM (SEEPROM) off-chip on the module; and (iii) use this data, for example, at Initial Machine Load (IML) (also known as IPL (system bring-up)) or during system operation depending on workload to optimize power and/or performance of the processor chip. The skilled artisan will appreciate that IML typically includes all the operational parameter settings for the machine.

Determining the $V_{dd}$/Frequency SCHMOO

To determine invalid $V_{dd}$/Frequency settings, one must be able to detect erroneous operation of each core. Certain well-regarded processor chips, such as IBM's Z-SERIES and P-SERIES processor chips, already have many error detection features built-in to the internal buses and computational units. In some applications, these existing ECC circuits are adequate for purposes of determining the SCHMOO plot. In other applications, one can take a critical path (known in synthesis), replicate that critical path, and monitor the path for a valid operating state of that path operating on random data (random data can be generated, and the output of this path could be compared to expected outputs for this random pattern). By way of example and not limitation, either of these methods could be used to detect erroneous operation of the circuitry.

Figure 1:
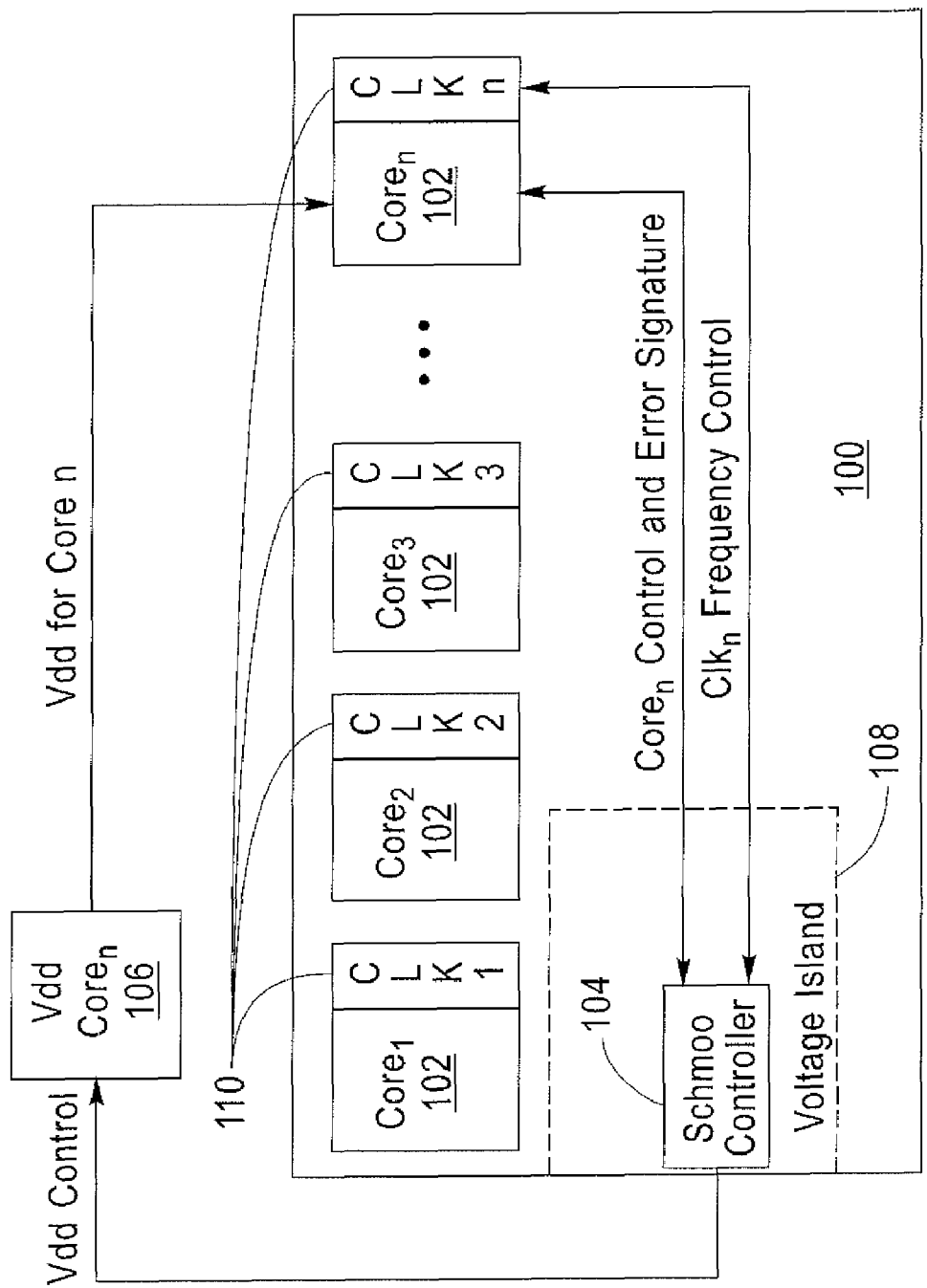
FIG. 1 shows an exemplary multi-chip core according to an aspect of the invention.

Reference should now be had to FIG. 1, which depicts an exemplary inventive multi-core chip 100 with associated elements employed to perform automated SCHMOO testing according to an aspect of the invention. To generate the SCHMOO for a particular core, four elements can be employed, namely, error detecting elements, voltage control, local core frequency control, and a SCHMOO test controller.

As noted, there should be element(s) to detect errors in each central processing unit (CPU) core 102. These may be, for example, dedicated, critical path replica circuits, or one may simply employ error detection via parity checks, ECC or, for combinatorial logic, parity prediction circuits. In practice, processors use a mix of these techniques to detect different types of error states depending on the circuit type. These error checking circuits are not shown explicitly in FIG. 1, as these circuits are designed into and exist throughout the cores 102. The SCHMOO Controller 104 should be able to check and reset the state of error counters in the cores 102, and read any error signatures. A non-limiting example of a signature would be a case where all error detection circuit outputs are OR-ed together to flag any occurrence of an error in the core.

There should also be the aforementioned voltage control, that is, a method to control the $V_{dd}$ of each core 102 under test. It should be noted that cores 1, 2, 3, . . . , n are shown, and while the $V_{dd}$ control for core n only is shown, all cores will have appropriate $V_{dd}$ control. This will typically be done via an external voltage regulator 106 providing a control signal ($V_{dd}$ control), though in some processors a buck-down regulator can be placed on the processor die itself (this approach is believed to be less preferable, as the power density of the processor increases for this approach).

The aforementioned local core frequency control is preferably provided by using the local clock generation element 110 ($CLK_1$, $CLK_2$, $CLK_3$, . . . , $CLK_n$), but this approach is meant to be exemplary and not limiting.

Finally, the aforementioned SCHMOO test controller 104 can be located on the chip 100 or off-chip, to perform the SCHMOO test. If the controller is on chip, as in the example in FIG. 1, then preferably, it should sit within its own stable voltage island 108 to assure proper operation of the controller 104 during the testing.

An exemplary SCHMOO test procedure is set forth below.

SCHMOO Test Initialization

The $V_{dd}$ can first be set for each core 102, and the frequency set at a value determined to be low enough for all operational cores to work. It should be noted that preferably, the same $V_{dd}$ is used for all cores at this stage. However, while preferable, the invention is not intended to be restricted to a uniform $V_{dd}$ approach, as one could employ techniques with different $V_{dd}$ values and this would also work, albeit less efficiently than the SCHMOO algorithm would be for a uniform $V_{dd}$ approach. The controller 104 clears all error counters and kicks-off a test for a specified time, T. At the end of this time period, all cores 102 are checked for errors to assure that the $V_{dd}$ was high enough and frequency low enough for all cores 102 to work.

SCHMOO Test

In one exemplary preferred approach, $V_{dd}$ can be held constant for each core 102 by controller 106 (it being understood that control is only shown for core n for purposes of illustrative convenience, but that all the cores can have suitable $V_{dd}$ control). The controller 104 can interact with elements 110 to increment the frequency by a predetermined step for each core 102, wait for the core to stabilize, reset error counters, and wait the specified time to check for errors. If no errors are observed, the frequency of each core 102 would be increased and the same technique repeated until a frequency is reached at which one or mole cores 102 fail. When a core is failed at a particular $V_{dd}$ and frequency, this fact is logged, and the test continues until all cores fail at some maximum frequency.

After finding the frequency at which all cores 102 fail for a certain $V_{dd}$, the SCHMOO Controller 104 then drops the frequency of all cores (by interaction with elements 110) and changes $V_{dd}$ (interacting with 106) by a predetermined step (up or down, depending on where the test started), and repeats the frequency SCHMOO algorithm described in the preceding paragraph until all cores fail at some maximum frequency for the new $V_{dd}$ setting. This cycle is repeated until a maximum or minimum $V_{dd}$ is reached; if $V_{dd}$ is decremented, there may be a $V_{dd}$ at which none of the cores 102 will work at the lowest desired frequency.

When all cores are tested at all points in the $V_{dd}$—frequency grid, the SCHMOO test is over, and data can be logged (for example, by reading such data out of the SCHMOO Controller 104).

It will be appreciated that one can re-test a core 102 at the same frequency to confirm errors, or use other techniques to determine the precise error rate, if desired, at a particular $V_{dd}$ and frequency setting. To speed testing, all the cores 102 can be exercised in parallel, each being run through the algorithm at the same time. It may be advantageous to disable core-to-core interconnects (omitted from FIG. 1 for clarity) during the "maximum core frequency" testing phase, allowing all cores 102 to be exercised to determine individual performance. Again, a dedicated, on-chip controller 104 (or controllers) can perform these SCHMOO tests, or an off-chip controller can manage and control the test process in a manner similar to that described for on-chip SCHMOO controller 104.

When the valid operating $V_{dd}$/frequency range is known for each core 102, the interconnects between the cores can be checked in a similar manner with one further test, setting each processor to an extreme maximum or minimum frequency of valid operation compared to all the other cores 102 connected to it, and performing a single ECC test at the maximum desired frequency offset between the cores. If an interconnect error is determined for a particular frequency offset between cores, the frequency offset between cores can be reduced, and the test run again until the interconnect functions properly. Ideally, the interconnect(s) can be designed to be more robust than the random logic so that the interconnects will work over the entire range of operating $V_{dd}$/frequency of all the cores, requiring only validation of operation, for example, with "de" level-sensitive scan design (LSSD) testing. As used herein, "random logic" encompasses processor unit(s), such as core(s) 102 and associated cache(s).

When testing is finished, the SCHMOO data for each core should be saved for that particular chip. If this process is implemented during manufacture, the SCHMOO data could be stored in e-fuse arrays in each core 102, or in a common space on the chip 100, containing the data for all the cores 102. The data could also be placed on an electronically-erasable programmable read-only memory (EEPROM), often called a VPD (Vital Product Data) PROM, as this VPD PROM is typically already packaged on the module with the above-mentioned IBM P-SERIES and Z-SERIES chips and currently contains other chip data and settings. At IPL, the SCHMOO data, as well as the suggested $V_{dd}$ and frequency settings for each core 102, can be read from the VPD and the chip configured appropriately. Note that use with IBM P-SERIES and Z-SERIES chips is exemplary and not intended to be limiting.

This SCHMOO data may change, for example, with environmental conditions or as the chip 100 ages. The procedure described herein can be implemented as an in-field system recalibration, if necessary, to allow re-centering of the performance parameters of each core with environmental or aging changes. In such a case, the new data could be stored by the service processor or similar system control element in order to effect new settings in the event of system IML.

Optimizing System Performance

Once the $V_{dd}$/Frequency SCHMOO is known, the cores 102 can be configured to provide the optimum power and/or performance for a given workload. The present invention does not require new system optimization algorithms per se; rather, inventive techniques described herein provide the data needed by known power optimization algorithms. Inventive techniques can be applied, for example, to an asynchronous, multi-core chip, and can provide techniques for SCHMOO testing all of the cores on such a chip in order to provide such needed data (for example, for blade server applications). One non-limiting example of a known optimization technique that can benefit from data determined using inventive techniques described herein is set forth in US Patent Application Publication 2006/0288241 of Felter, Keller, Rajamani, and Rusu, entitled "Performance Conserving Method for Reducing Power Consumption in a Server System," published Dec. 21, 2006, the disclosure of which is expressly incorporated herein by reference for all purposes. One or more exemplary inventive embodiments provide a fast method and architecture for multi-core, asynchronous processor chip SCHMOO testing which will allow, for example, SCHMOO updates in the field to optimize power and/or performance as the hardware ages, or to allow system deployment engineers to know the effect of noise environments (varies from customer to customer) on processor functions.

Of course, the same procedure outlined above can be used on a multi-core synchronous chip. Each core can be isolated, and the $V_{dd}$ domains and frequency controlled to "SCHMOO" the chip to determine the operating space for a multi-core synchronous chip in an efficient manner which allows for automated field updates to the SCHMOO should some technology aging become apparent.

Additional Comments

In view of the above discussion, it will be appreciated that an exemplary embodiment of an inventive circuit can include a plurality of cores 102, each of the cores having error detection circuitry and being connected to selected other ones of the cores 102 via core-to-core interconnects. A voltage controller interface to controller 106 can also be provided. Where controller 106 is off-chip, this interface can be a suitable pin connector, for example; where controller 106 is on-chip, the interface can simply be appropriate on-chip interconnections. A frequency control module can also be provided; for example, such a module can be formed by local clock generation elements 110 ($CLK_1$, $CLK_2$, $CLK_3$, ..., $CLK_n$) interfacing with SCHMOO controller 104. The exemplary circuit also includes such SCHMOO controller 104. Controller 104 can be on-chip or an interface to an off-chip SCHMOO controller can be provided as desired, in a manner similar to that described for element 106.

The cores 102, the voltage controller interface to controller 106, the frequency control module formed by elements 110, and the SCHMOO controller 104 are operatively interconnected and configured to cause execution of the following steps:

(i) resetting all error detection circuitry, setting $V_{dd}$ for each of the cores 102, and setting a (preferably single) frequency believed to be sufficiently low for all operational ones of the plurality of cores to function;

(ii) checking for errors in individual ones of the plurality of cores after a specified time to verify that $V_{dd}$ was sufficiently high and the (preferably single) frequency sufficiently low for all operational ones of the plurality of cores 102 to function;

(iii) while holding $V_{dd}$ constant for each of the cores 102, incrementing frequency by a predetermined amount for each of the cores 102;

(iv) waiting for stabilization;

(v) checking for errors;

(vi) repeating the incrementing until at least one of the cores 102 fails and logging such failure; and (vii) repeating step (vi) until all of the cores 102 have failed.

In one or more embodiments, the cores 102, the voltage controller interface to controller 106, the frequency control module including elements 110, and the SCHMOO controller 104 are further configured to cause execution of the additional step of (viii) incrementing $V_{dd}$ and repeating steps (i)-(v) for the incremented $V_{dd}$. Yet further; the cores 102, the voltage controller interface to controller 106, the frequency control module including elements 110, and the SCHMOO controller 104 can be further configured to cause execution of the additional step of repeating step (viii) until a limiting value of $V_{dd}$ is reached.

Still further additional steps are possible in one or mole embodiments. For example, the cores 102, the voltage controller interface to controller 106, the frequency control module including elements 110, and the SCHMOO controller 104 can be further configured to cause, for example, one or more of execution of the additional step of selectively re-testing certain cores 102 to confirm errors, and execution of the additional step of disabling the core-to-core interconnects during the determining step. Even further, the cores 102, the voltage controller interface to controller 106, the frequency control module including elements 110, and the SCHMOO controller 104 can be configured to cause execution of the additional steps of setting a given one of the cores 102 to an extrema of frequency offset from adjacent cores 102, detecting an interconnect error associated with a given one of the core-to-core interconnects between the given one of the cores 102 and the adjacent cores 102, and setting the given one of the cores 102 to a reduced frequency offset, and repeating the detecting, until no errors ale noted.

The inventive circuit can include a voltage island 108, with the SCHMOO controller 104 formed on the voltage island. Further, voltage controller 106 can be coupled to the voltage controller interface, and can be formed on chip 100, or reside off-chip. The SCHMOO controller 104 can also be on or off-chip. Inventive circuits can thus be thought of, in various instances, as including interfaces to controllers and indeed as including the controllers themselves.

It will be appreciated that an exemplary method of optimizing performance of a multi-core chip 100 having a plurality of cores 102 can include the steps of determining a $V_{dd}$-frequency SCHMOO characteristic for each of the plurality of cores 102 individually; saving data indicative of the Vdd-frequency SCHMOO characteristics for each of the plurality of cores 102; configuring the cores 102 to obtain a configuration providing at least one of optimum power consumption and optimum performance, for a given workload, based on the saved data; and saving the configuration such that it may be updated and used on at least one of a periodic and a continual basis. In some approaches, the step of saving data indicative of the Vdd-frequency SCHMOO comprises saving in an E-fuse array on the multi-core chip 100. In other instances, the step of saving data indicative of the Vdd-frequency SCHMOO comprises saving in an off-chip SEEPROM.

Figure 2:
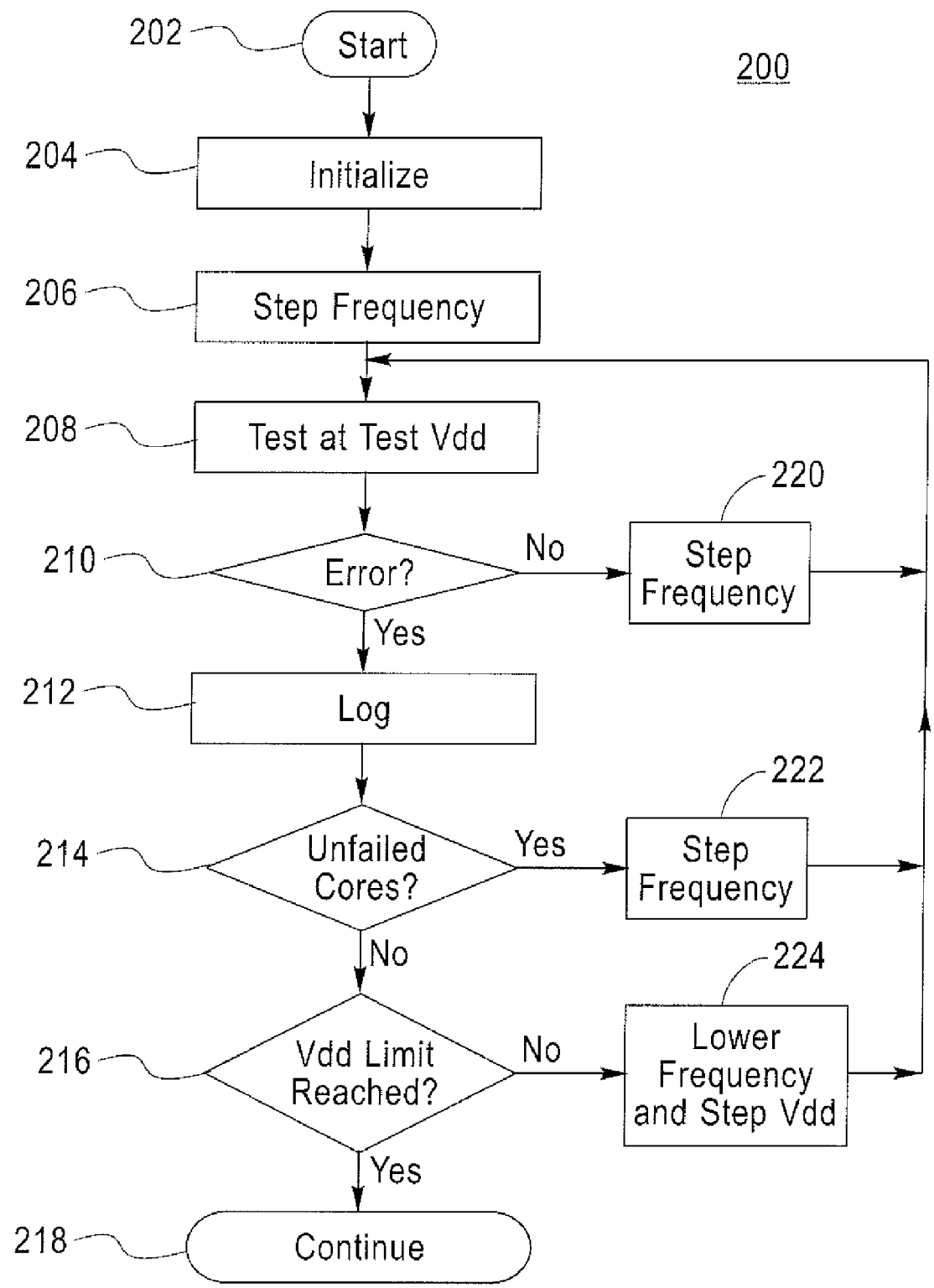
FIG. 2 is a flow chart of exemplary method steps according to another aspect of the invention.

With reference now to FIG. 2, which shows a flow chart 200 of exemplary steps, after beginning at block 202, conditions can be initialized at block 204. This can be done, for example, by resetting all error counters, setting $V_{dd}$ for each of the cores 102, and setting a frequency believed to be sufficiently low for all operational ones of the plurality of cores to function. Again, the same voltage is preferably but not necessarily used for all cores at this stage. Block 204 can also include checking for errors in individual ones of the plurality of cores 102 after a specified time to verify that $V_{dd}$ was sufficiently high and the frequency sufficiently low for all operational ones of the plurality of cores 102 to function.

The above-mentioned step of determining a $V_{dd}$-frequency SCHMOO characteristic for each of the plurality of cores 102 can include, for example:
 (i) while holding $V_{dd}$ constant for each core, incrementing frequency by a predetermined amount for each core, as at block 206;
 (ii) waiting for stabilization (during testing as per block 208);
 (iii) checking for at least one of bit errors and operational errors, as at decision block 210;
 (iv) repeating the incrementing until at least one core fails and logging such failure (as per frequency stepping block 220 at the "NO" branch of block 210, with logging at block 212 when the "YES" branch is followed due to an error); and
 (v) repeating step (iv) until all cores have failed, as per the decision block 214, with frequency stepping block 222 at the "YES" branch, with the "NO" branch to block 216 only being followed when all cores have failed.

The determining step can also include (as per block 224) (vi) incrementing $V_{dd}$ and repeating steps (i)-(v) for the incremented $V_{dd}$; this step (vi) can in turn be repeated until a limiting value of $V_{dd}$ is reached, as per decision block 216, with appropriate changes to frequency and voltage at block 224 ("NO" branch indicating voltage limit has not yet been reached), while the process ends at "continue" block 218 once the voltage limit has been reached, as per "YES" branch 216.

In some instances, the additional step of selectively retesting certain cores to confirm errors can be performed. Further, in some instances, the determining step is performed on each of the cores 102 substantially in parallel, and the additional step of disabling core-to-core interconnects during the determining step can be performed in such instances.

In some cases, the following additional steps can be performed: setting a given one of the cores 102 to an extrema of frequency offset from adjacent cores 102; detecting an interconnect error associated with an interconnection between the given one of the cores 102 and the adjacent cores 102; and setting the given one of the cores 102 to a reduced frequency offset and repeating the detecting until no errors are noted. In such case, a further step can include designing the interconnections to be more robust than the cores and associated caches of the cores (please refer to above discussion of "random logic").

In some instances, the steps are performed substantially when the chip 100 begins its service life; in such instances, the additional step of repeating the determining, saving SCHMOO data, configuring, and saving configuration steps can be repeated after the chip has substantially changed due to at least one of age and environmental conditions. As noted elsewhere, inventive techniques can be applied to both synchronous and asynchronous chips.

In one or more embodiments, if one or more cores do not operate over a sufficient range of $V_{dd}$ and/or frequency to be useful, then those cores may be disabled by e-fuse or other methods after the SCHMOO test for all the cores is completed. This is the "wafer test" core fail "fix"—ideally one would want to have n+1 or n+2 cores on a chip (where n is the desired number of operable cores) and indicate one or mole as unusable or unused; then the yield of the n cores can be quite good. The SCHMOO testing results can be used to determine which core(s) are disabled. At present, it is believed that it may be preferable to have one or two "extra" cores and to tolerate a single failed core by disabling such core.

A variety of techniques, utilizing dedicated hardware, general purpose processors, firmware, software, or a combination of the foregoing may be employed to implement the present invention and/or the various controllers (for example, 104, 106) or other components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 3:
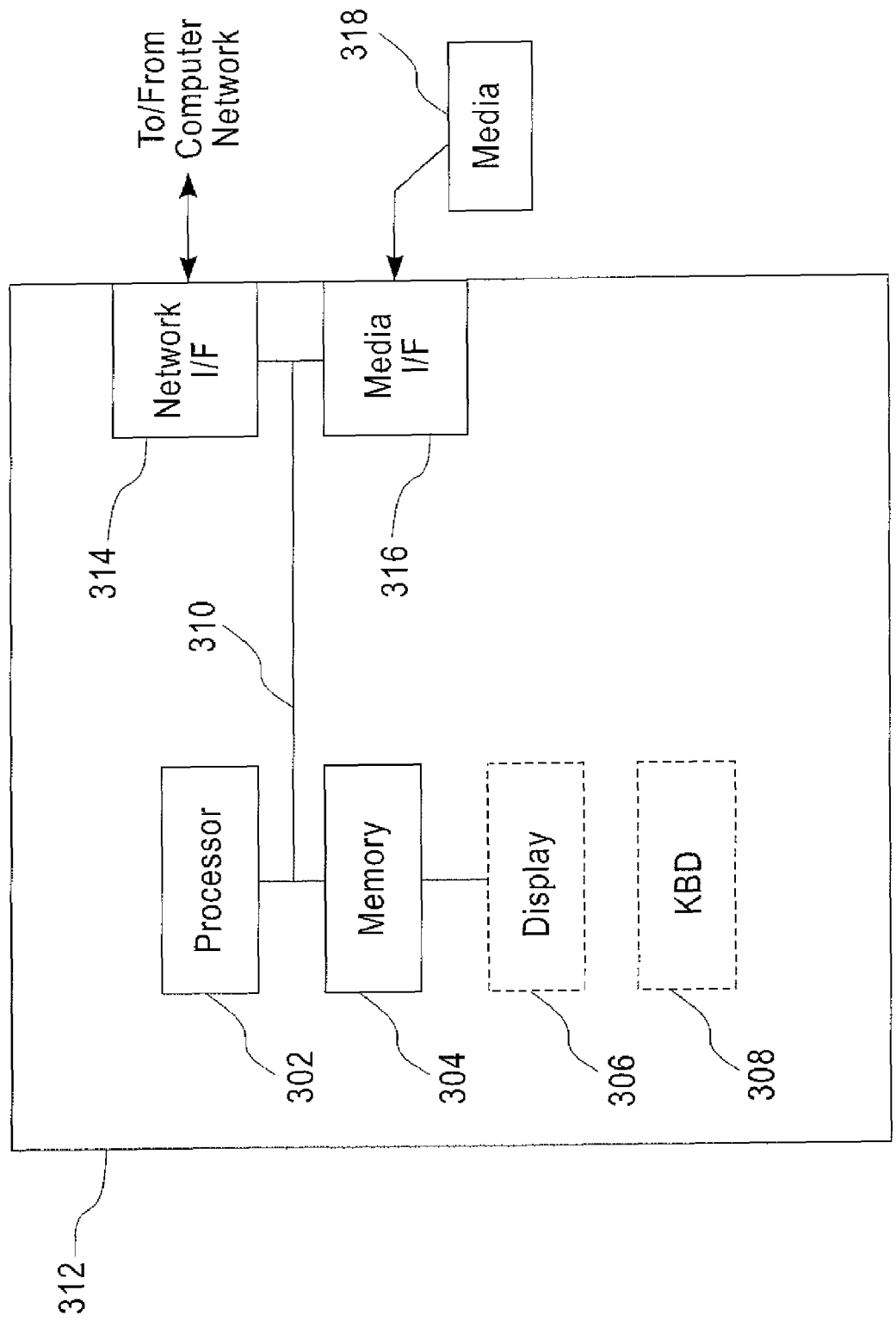
FIG. 3 depicts a computer system that may be useful in implementing one or more aspects and/or elements of the present invention.

One or more embodiments can make use of software running on a general purpose computer or workstation (or software or firmware can be used to implement elements such as controllers). With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU.

Such software could include, but is not limited to, firmware, resident software, microcode, and the like.

Furthermore, the invention can take the form of a computer program product accessible from a computer-usable or computer-readable medium (for example, media 318) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example memory 304), magnetic tape, a removable computer diskette (for example media 318), a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 302 coupled directly or indirectly to memory elements 304 through a system bus 310. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The techniques set forth herein can be used to optimize circuits realized on an integrated circuit chip. The chip design can be created, for example, in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design can then be converted into an appropriate format such as, for example, Graphic Design System II (GD-SII), for the fabrication of photolithographic masks, which typically include multiple copies of the chip design in question that ate to be formed on a wafer. The photolithographic masks can be utilized to define areas of the wafer (and/or the layers thereon) to be etched or otherwise processed.

Resulting integrated circuit chips can be distributed by the fabricator in raw wafer form (that is, as a single wafer that has multiple unpackaged chips), as a bare die or in a packaged form. In the latter case, the chip can be mounted in a single chip package (such as a plastic carrier, with leads that are affixed to a mother board or other higher level carrier) or in a multi-chip package (such as a ceramic carrier that has either or both surface interconnections or buried interconnections). In any case, the chip may then be integrated with other chips, discrete circuit elements and/or other signal processing devices as part of either (a) an intermediate product, such as a mother board, or (b) an end product. The end product can be any product that includes integrated circuit chips, ranging from toys and other low-end applications to advanced computer products having a display, a keyboard or other input device, and a central processor.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of optimizing performance of a multi-core chip having a plurality of cores, said method comprising the steps of:
    determining a $V_{dd}$-frequency SCHMOO characteristic for each of said plurality of cores individually;
    saving data indicative of said Vdd-frequency SCHMOO characteristics for each of said plurality of cores;
    configuring said cores to obtain a configuration providing at least one of optimum power consumption and optimum performance, for a given workload, based on said saved data;
    saving said configuration such that it may be updated and used on at least one of a periodic and a continual basis;
    setting a given one of said cores to an extrema of frequency offset from adjacent cores;
    detecting an interconnect error associated with an interconnection between said given one of said cores and said adjacent cores; and
    setting said given one of said cores to a reduced frequency offset and repeating said detecting until no errors are noted.

2. The method of claim 1, wherein said step of saving data indicative of said Vdd-frequency SCHMOO comprises saving in an E-fuse array on said multi-core chip.

3. The method of claim 1, wherein said step of saving data indicative of said Vdd-frequency SCHMOO comprises saving in an off-chip SEEPROM.

4. The method of claim 1, further comprising the additional step of designing said interconnections to be more robust than said cores and associated caches of said cores.

5. The method of claim 1, wherein said steps are performed substantially when said chip begins its service life, further comprising the additional step of repeating said determining, saving SCHMOO data, configuring, and saving configuration steps after said chip has substantially changed due to at least one of age and environmental conditions.

6. The method of claim 1, wherein said chip comprises a synchronous chip.

7. The method of claim 1, wherein said chip comprises an asynchronous chip.

8. The method of claim 1, further comprising the additional step of initializing conditions by:
   resetting all error counters, setting $V_{dd}$ for each of said cores, and setting a frequency believed to be sufficiently low for all operational ones of said plurality of cores to function; and
   checking for errors in individual ones of said plurality of cores after a specified time to verify that $V_{dd}$ was sufficiently high and said frequency sufficiently low for all operational ones of said plurality of cores to function;
   wherein said determining step comprises:
   (i) while holding $V_{dd}$ constant for each core, incrementing frequency by a predetermined amount for each core;
   (ii) waiting for stabilization;
   ii) checking for at least one of bit errors and operational errors;
   (iv) repeating said incrementing until at least one core fails and logging such failure; and
   (v) repeating step (iv) until all cores have failed.

9. The method of claim 8, wherein said determining step further comprises:
   (vi) incrementing $V_{dd}$ and repeating steps (i)-(v) for said incremented $V_{dd}$.

10. The method of claim 9, wherein said determining step further comprises repeating step (vi) until a limiting value of $V_{dd}$ is reached.

11. The method of claim 10, further comprising the additional step of selectively re-testing certain cores to confirm errors.

12. The method of claim 10, wherein said determining step is performed on each of said cores substantially in parallel, further comprising the additional step of disabling core-to-core interconnects during said determining step.

13. The method of claim 10, further comprising the additional steps of:
   providing more than n of said cores, where n is a desired number of operable cores; and
   responsive to said steps (i)-(vi) indicating that at least one of said cores does not operate over a desirable voltage-frequency range, disabling said at least one of said cores.

14. A circuit comprising:
   a plurality of cores, each of said cores having error detection circuitry and being connected to selected other ones of said cores via core-to-core interconnects;
   a voltage controller interface;
   a frequency control module; and
   a SCHMOO controller;
   wherein:
   said cores, said voltage controller interface, said frequency control module, and said SCHMOO controller are operatively interconnected and configured to cause execution of the following steps:
   (i) resetting all error detection circuitry, setting $V_{dd}$ for each of said cores, and setting a frequency believed to be sufficiently low for all operational ones of said plurality of cores to function;
   (ii) checking for errors in individual ones of said plurality of cores after a specified time to verify that $V_{dd}$ was sufficiently high and said frequency sufficiently low for all operational ones of said plurality of cores to function;
   (iii) while holding $V_{dd}$ constant for each of said cores, incrementing frequency by a predetermined amount for each of said cores;
   (iv) waiting for stabilization;
   (v) checking for errors;
   (vi) repeating said incrementing until at least one of said cores fails and logging such failure;
   (vii) repeating step (vi) until all of said cores have failed;
   (viii) setting a given one of said cores to an extrema of frequency offset from adjacent cores;
   (ix) detecting an interconnect error associated with an interconnection between said given one of said cores and said adjacent cores; and
   (x) setting said given one of said cores to a reduced frequency offset and repeating said detecting until no errors are noted.

15. The circuit of claim 14, further comprising a voltage island, wherein said SCHMOO controller is formed on said voltage island.

16. The circuit of claim 14, further comprising a voltage controller coupled to said voltage controller interface.

17. The circuit of claim 14, wherein said cores, said voltage controller interface, said frequency control module, and said SCHMOO controller are further configured to cause execution of the additional step of:
   (xi) incrementing $V_{dd}$ and repeating steps (i)-(v) for said incremented $V_{dd}$.

18. The circuit of claim 17, wherein said cores, said voltage controller interface, said frequency control module, and said SCHMOO controller are further configured to cause execution of the additional step of repeating step (viii) until a limiting value of $V_{dd}$ is reached.

19. The circuit of claim 18, wherein said cores, said voltage controller interface, said frequency control module, and said SCHMOO controller are further configured to cause execution of the additional step of selectively re-testing certain cores to confirm errors.

20. The circuit of claim 18, wherein said cores, said voltage controller interface, said frequency control module, and said SCHMOO controller are further configured to cause execution of the additional step of disabling said core-to-core interconnects during said determining step.

21. An article of manufacture for optimizing performance of a multi-core chip having a plurality of cores, comprising a tangible machine readable storage medium containing one or more programs which when executed implement the steps of:
   determining a $V_{dd}$-frequency SCHMOO characteristic for each of said plurality of cores individually;
   saving data indicative of said Vdd-frequency SCHMOO characteristics for each of said plurality of cores;
   configuring said cores to obtain a configuration providing at least one of optimum power consumption and optimum performance, for a given workload, based on said saved data;
   saving said configuration such that it may be updated and used on at least one of a periodic and a continual basis;
   setting a given one of said cores to an extrema of frequency offset from adjacent cores;
   detecting an interconnect error associated with an interconnection between said given one of said cores and said adjacent cores; and
   setting said given one of said cores to a reduced frequency offset and repeating said detecting until no errors are noted.

* * * * *